United States Patent
Reddy et al.

(10) Patent No.: US 10,998,732 B2
(45) Date of Patent: May 4, 2021

(54) SYSTEM AND METHOD FOR DIVERSE MULTI-SOURCE ENERGY MANAGEMENT

(71) Applicant: Caterpillar Inc., Deerfield, IL (US)

(72) Inventors: Suresh B. Reddy, Peoria, IL (US); Dachuan Yu, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 98 days.

(21) Appl. No.: 16/359,685

(22) Filed: Mar. 20, 2019

(65) Prior Publication Data

US 2020/0303925 A1   Sep. 24, 2020

(51) Int. Cl.
| | |
|---|---|
| *H02J 3/00* | (2006.01) |
| *H02J 3/46* | (2006.01) |
| *H02J 3/38* | (2006.01) |
| *H02J 7/04* | (2006.01) |
| *G05F 1/66* | (2006.01) |
| *H02K 7/18* | (2006.01) |

(52) U.S. Cl.
CPC .............. *H02J 3/46* (2013.01); *G05F 1/66* (2013.01); *H02J 3/382* (2013.01); *H02J 7/04* (2013.01); *H02K 7/1815* (2013.01)

(58) Field of Classification Search
CPC .... H02J 3/46; H02J 7/04; H02J 3/382; H02K 7/1815; G05F 1/66
USPC .......................................................... 307/84
See application file for complete search history.

(56) References Cited

U.S. PATENT DOCUMENTS

| | | | | |
|---|---|---|---|---|
| 8,315,745 | B2 * | 11/2012 | Creed ....................... | H02J 4/00 700/295 |
| 8,346,416 | B2 | 1/2013 | Liu et al. | |
| 8,364,287 | B2 * | 1/2013 | Pearson ............. | H01M 16/006 700/11 |
| 9,197,071 | B2 | 11/2015 | Williams | |
| 10,283,966 | B2 * | 5/2019 | Macdonald ............... | H02J 3/38 |
| 2004/0046458 | A1 * | 3/2004 | MacKay ................ | H02J 9/002 307/80 |
| 2009/0140576 | A1 * | 6/2009 | Yu ............................. | H02J 3/46 307/66 |
| 2010/0179704 | A1 * | 7/2010 | Ozog ...................... | H02J 3/322 700/291 |
| 2015/0097437 | A1 * | 4/2015 | Votoupal .................. | H02J 3/48 307/84 |

(Continued)

FOREIGN PATENT DOCUMENTS

| | | |
|---|---|---|
| CN | 101716931 A | 6/2010 |
| GB | 2527806 A | 1/2016 |
| WO | WO 2017041752 A1 | 3/2017 |

*Primary Examiner* — Ryan Jager
(74) *Attorney, Agent, or Firm* — von Briesen & Roper, s.c.

(57) ABSTRACT

A hybrid micro-grid system for providing power to a load connected to a common bus. The system includes at least one renewable power source, at least one genset, at least one energy storage unit, and an asset management controller operatively coupled to the power sources supply power to the common bus. The AMC is configured to determine a renewable cost function, a genset cost function, and a storage cost function, then assigns a priority of each power source based on the corresponding cost function. The AMC determines a cascade of the power sources based on the determined priority and selectively distributes a power demand of the load between each power source based on the determined cascade.

18 Claims, 4 Drawing Sheets

(56) References Cited

U.S. PATENT DOCUMENTS

2016/0006384 A1* 1/2016 Hardwick .............. G05B 15/02
 700/287
2016/0159239 A1 6/2016 Shi et al.

\* cited by examiner

SYSTEM AND METHOD FOR DIVERSE MULTI-SOURCE ENERGY MANAGEMENT

TECHNICAL FIELD

The present disclosure relates generally to micro-grid systems and, more particularly, relates to systems and methods for reducing operating costs of diverse power sources in micro-grid systems.

BACKGROUND

For off-grid application sites, such as remote villages, islands, remote mining sites, remote military installations, on-board ships, and the like, reliable power supplies are needed. Hybrid systems containing combustion engine-driven generator setups (gensets) and battery banks are usually used to provide a continuous power supply. However, in these hybrid systems, refueling and maintenance costs become significant over time. In order to reduce such costs, renewable power sources, such as photovoltaic power or wind power, may be used as the primary power sources, while diesel gensets may be used as secondary power sources. Excess energy generated by the primary or secondary power sources (i.e., energy not consumed by a load) may be used to charge a battery bank configured to store electric energy for backup use. Typically, it is preferred that a high percentage of energy is generated by the renewable power sources. Since renewable power sources tend to be unreliable due to environmental conditions, e.g. lack of wind or solar, it is important to supplement the system with secondary sources during times of low renewable sources. However, to maintain peak efficiency and lower overall operating cost during the lifetime of the equipment, it is not enough just to monitor the load and distribute the load according to rated operating conditions.

An attempt to improve micro-grid efficiencies has been proposed in U.S. 2016/0118799 A1 by Seww Energy Inc. (hereinafter "Seww"). Seww proposes a microgrid system that provides reliable hybrid power from solar, wind, battery sources as well as diesel fuel generators to stabilize the power quality to reduce risk of damaging sensitive medical equipment. Seww also proposes that the diesel generators can be turned off periodically to conserve fuel. Seww goes on the propose a Microgrid Assessment Tool (MAT) that may be used to capture granular load profiles to generate a feasibility report. The Seww microgrid system relies on the generator's minimum loading ratio (MLR) to benchmark the system's operating efficiency. However, Seww doesn't incorporate other monitoring other metrics of the renewable resource, the batteries, or the generators which can reduce operating costs, improve fuel efficiency, and also extend the overall useable lifetime of the equipment.

The disclosed method and system for a hybrid micro-grid system is directed to overcoming one or more of the problems set forth above.

SUMMARY OF THE DISCLOSURE

In accordance with one aspect of the disclosure, a hybrid micro-grid system is provided. The system includes a plurality of power sources to selectively supply power to a common bus. The plurality of power sources includes at least one renewable power source (RPS), at least one genset, and at least one energy storage unit (ESU). The system also includes an asset management controller (AMC) operatively coupled to the at least one RPS, at least one genset, and at least one (ESU). The AMC is configured to determine a renewable cost function associated with the at least one RPS, a genset cost function associated with the at least one genset, and a storage cost function associated with the at least one ESU. The AMC assigns a priority to each power source based on the corresponding cost function and selectively distributes a power demand of a load connected to the common bus amongst each power source based on the determined priority.

In accordance with another aspect of the disclosure, a hybrid micro-grid system is provided. The system includes a plurality of power sources each configured to selectively supply power to a common bus, the plurality of power sources including at least one RPS, at least one genset, and at least one ESU. The system includes an AMC operatively coupled to each of the plurality of power sources. The AMC is configured to determine a renewable cost function associated with the at least one RPS, a genset cost function associated with the at least one genset, and a storage cost function associated with the at least one ESU. The AMC assigns a priority to each power source based on the corresponding cost function and determines a cascade of power sources based on the determined priority. The AMC then controls a subsequent power source in the cascade based on exceeding an upper threshold of a preceding power source or a lower threshold of said subsequent power source.

In accordance with a further aspect of the disclosure, a method for operating a hybrid micro-grid system is provided. The system includes a plurality of power sources each configured to selectively supply power to a common bus, the plurality of power sources including at least one RPS, at least one genset, and at least one ESU, and an AMC operatively coupled to the plurality of power sources, The method includes determining a renewable cost function associated with the at least one RPS, a genset cost function associated with the at least one genset, and a storage cost function associated with the at least one ESU. A priority is assigned to each power source based on the corresponding cost function. A cascade of the power sources is determined based on the assigned priority. A power demand of a load connected to the common bus is selectively distributed amongst each power source based on the assigned priority.

DETAILED DESCRIPTION

Aspects of the disclosure will now be described in detail with reference to the drawings, wherein like reference numbers refer to like elements throughout, unless specified otherwise.

The present disclosure provides a micro-grid system having a plurality of power sources, including at least one renewable power source (RPS), at least one energy storage unit (ESU), at least one genset, and an asset management controller (AMC) configured to service a load on a common bus. The AMC is configured to prioritize the various power sources according to a cost function that accounts for various operational factors associated with each power source and a comparison to a cost associated with a tie-in to a local utility grid. The operational factors for the RPS include at least available power source and a volatility function; for the ESU the operational factors include at least a battery chemistry, state of charge, state of health, charging and discharging efficiencies, number of discharge cycles, and an optimal charge range of the at least one ESU; and for the genset the operational factors include at least an optimal operating range, fuel cost, fuel efficiency, emissions output, lifetime usage, number of power cycles, and spinning reserve of the at least one genset. The cost function represents an aggregate cost of operating the corresponding power source based on the operational factors. The AMC then selectively distributes the load to each power source in order from the lowest cost function to highest cost function. The disclosed micro-grid system improves reliability, prolongs asset life, improve asset availability, and reduce overall operating costs.

Figure 1:
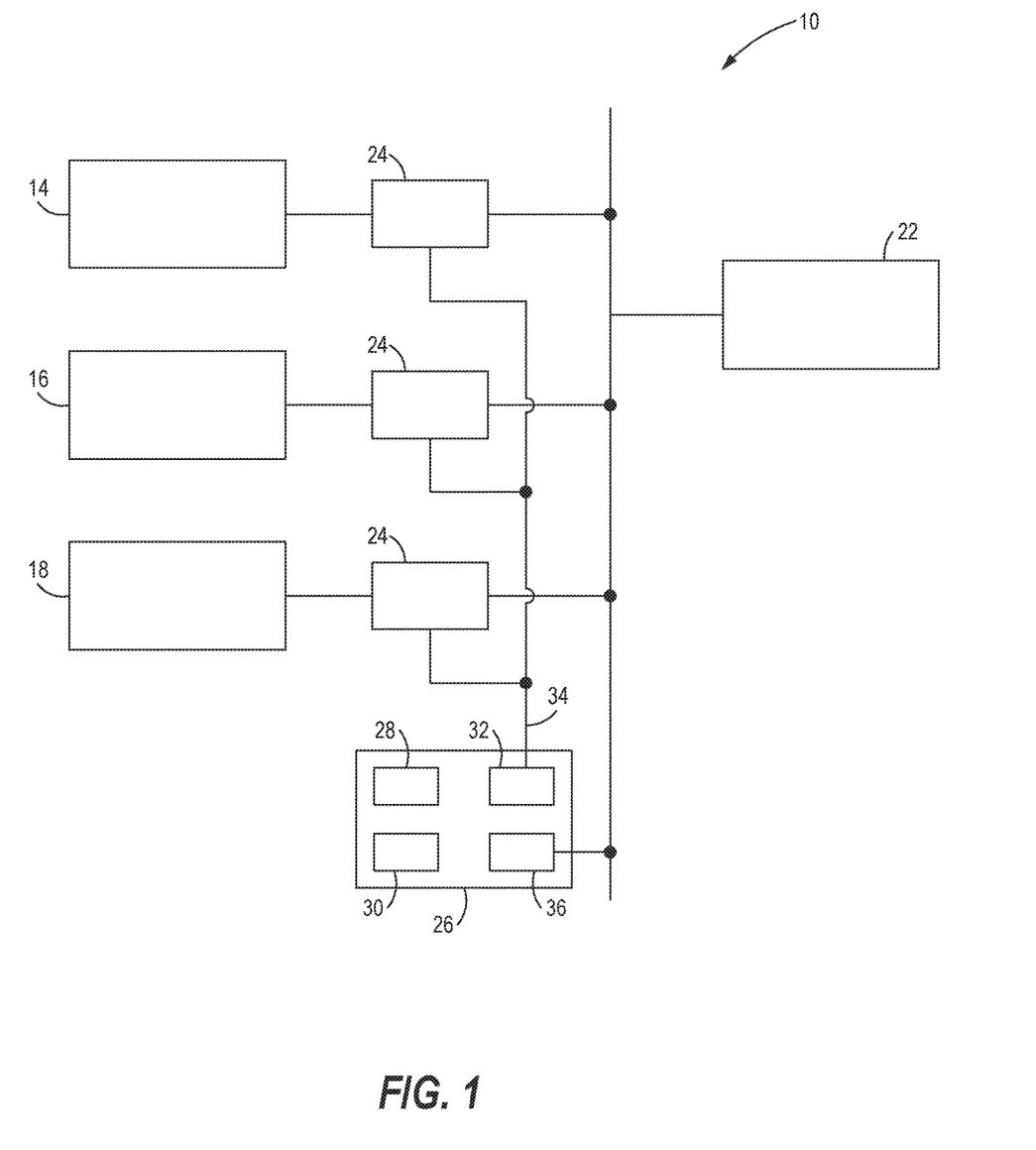
FIG. 1 is a schematic view of a hybrid micro-grid system in accordance with an embodiment of the present disclosure.

Referring now to FIG. 1, a schematic diagram of a micro-grid system 10 is shown, in accordance with at least some embodiments of the present disclosure. As shown, the micro-grid system 10 may includes a plurality of diverse power sources or power sources 12 which includes at least one renewable power source (RPS) 14, at least one energy storage unit (ESU) 16, and at least one genset 18 supplying power to a common bus 20 which services a load 22. In a preferred embodiment, the micro-grid system 10 will include a plurality of RPS's 10, a plurality of ESU's 14, and a plurality of gensets 18 all of which may vary in number, size, type, or capability based on the upon the application, availability, as well as location. For the purpose of this disclosure they will be described as singular entities that can embody sets of the corresponding type of power source 12. It will also be understood that only those components that are necessary for a proper understanding of the present disclosure have been shown and described here. Nevertheless, several other components, such as inverters, rectifiers, controllers, etc., that are commonly used in combination or conjunction with micro-grid systems are contemplated and considered within the scope of the present disclosure.

The micro-grid system 10 may be employed in a variety of applications such as, but not limited to, on islands, remote mining sites, remote villages, military installations, ships, residential neighborhoods, or other off-grid application where a connection to a public utility is not possible or not desired. As previously stated, the single RPS 16 illustrated can embody a set of diverse RPS's in any combination. For example, the RPS 16 may include any combination of that rely on photovoltaics, wind turbines, geothermal, hydroelectric, biomass, tidal, biofuel, and the like. Similarly, the single ESU 16 can embody any combination of diverse energy storage devices. For example, electrochemical units may include various rechargeable battery chemistries, lithium-ion, high-power lead acid, fuel cells, ultra-capacitors, flow batteries, etc.; mechanical storage may include flywheels, hydraulic pumped storage, compressed storage, gravitational potential energy, etc.; thermal storage; and the like. The gensets 18 can embody any combination of rotor-stator combinations driven by a prime mover such as gas, diesel, dynamic gas blending (DGB) combustion engine that can operate at a constant speed or a variable speed. Each power source 14, 16, 18 is associated with a transfer unit 24 which is configured to selectively supply power from the corresponding power source 14, 16, 18 to the common bus 20. The transfer unit is also configured to ensure that the output power has the correct frequency, voltage magnitude, and phase before actuating a switch to enable the corresponding unit to supply power to the common bus 20. In addition, the transfer units 24 may be configured to monitor and record operational data regarding operational performance to ensure each power source 14, 16, 18 is operating within predetermined operational thresholds. The transfer units 24 also generate and transmit signals associated with recorded operational data in real time to an asset management controller (AMC) 26.

The AMC 26 is configured to compare an actual output of the plurality of power sources 12 to a desired output and selectively control and adjust the power output of each power source 14, 16, 18 to meet the power demand of the load 22. The controller may include a processor 28 coupled to a memory module 30 which may store one or more programs or software executables to control the operation of the AMC 26 and/or the transfer units 24 to distribute the load 22 among the power sources 14, 16, 18 in accordance with at least one embodiment of the present disclosure. For example, the processor 28 may implement a control strategy that accounts for the predetermined operational thresholds and a corresponding cost function to assign a priority based on marginal cost considerations to reduce the overall operation cost of the micro-grid system 10. The cost consideration may include instantaneous and historical operating costs determined based on corresponding the operation factors of the power source 14, 16, 18. The processor 28 may also compare the overall operating cost of the micro-grid system to the cost of meeting the load demand based on power from a local power utility. The memory module 30 may include a storage device that stores executable software as well as stores the recorded operational data and related settings defining the operational thresholds. The storage device may include a volatile or non-volatile, magnetic, semiconductor, tape, optical, removable, non-removable, or other type of storage device or computer-readable medium. The transfer unit 24 may also include one or more of an application-specific integrated circuit (ASIC), a field-programmable gate array (FPGA), a computer system, and a logic circuit, configured to allow the transfer unit 24 to function in accordance with the disclosed embodiments. Accordingly, the memory module 30 of the AMC 26 may include, for example, the flash memory of an ASIC, flip-flops in an FPGA, the random access memory of a computer system, a memory circuit contained in a logic circuit, or some combination thereof.

The AMC 26 may also include a communication transceiver 32 which is able to send and receive communication and control signals with the transfer units 24 over a communication bus 34. The communication bus 34 may also be used to communicate data with external computing devices (not shown), such as diagnostic data or the like. The AMC 26 may also include various sensors 36, such as a voltage sensor and current sensor, for sensing voltage and current information from the power sources 14, 16, 18 and the load 22. It should be appreciated that the processor 28 may include one or more commercially available microprocessors, microcontrollers, digital signal processors (DSPs), and other similar devices that may be configured to perform the functions of the processor.

The AMC 26 is configured to distribute the load 22 among the various types of power sources 14, 16, 18 based on a cost function associated with each power source 14, 16, 18. The AMC 26 then assigns a priority to each power source 14, 16, 18 based on the corresponding cost function then selectively distributes the power demand of the load 22 between each of the powers sources based on the determined priority. The AMC 26 determines the cost function to ensure reliable power can be supplied to the load 22; prolonged lifetime for each of the power sources 14, 16, 18; and the micro-grid system 10 is operating at a lowest achievable cost. The cost function may aim to minimize fuel cost, maximize lifetime, and increase reliability.

In order to provide reliable power, the AMC 26 is configured to monitor active and reactive loads to prevent brown out conditions; ensure that enough reserve power is available to compensation for transient loads or loss of the RPS 12 due to environmental conditions (e.g. lack of solar and/or wind); and ensure that the connected power sources 14, 16, 18 are operating within optimal operating conditions and within safe operational thresholds. For example, the AMC 26 is configured to ensure that the RPS 14 is operating within nominal kW or kVA thresholds; reduce the charge/discharge cycles of the ESU 16 to prolong useable lifetime while maintaining maximum and minimum state of charge (SoC) limits; and ensure reverse powering damage from RPS 14 back to the genset 18 is avoided, gensets 18 are operating at optimal and/or safe power factors, and the gensets 18 are operating below maximum kW or kVA thresholds.

The AMC 26 is also configured to ensure the micro-grid system 10 is operating at the lowest available operating cost by prioritizing the available power generated by the RPS 14 either by supplying it directly to the common bus 20 or maximize recharging the ESU 16 via the RPS 14 while also minimizing usage and fuel consumption of the genset 18.

The AMC 26 determines the cost function for each of the plurality of power sources based on the recorded operational data and comparing the data to rules that are defined by optimal thresholds in real time such that the cost function is constantly updated during operation. This ensures that when a power source 14, 16, 18 becomes more expensive to operate compared to other power sources 14, 16 18, the AMC 26 will distribute the load 22 to a more efficient power source 14, 16, 18. It should be understood that while the RPS 14, the ESU 16, and genset 18 are described in the singular, the AMC 26 is configured to enable, disable, or adjust the load distributed on individual RPS units within the set of RPS's 16. This holds for individual ESU's within the set of ESU's 16 and individual gensets within the set of gensets 18 as depicted in FIG. 1. Each type of power source 14, 16, 18 can share the distributed load on the corresponding type proportional to their rated power.

For the RPS 14, the AMC 26 monitors the kW or kVA output from an associated signal generated and transmitted by the corresponding transfer unit 24. If the output kW/kVA is beyond acceptable limits, the AMC 26 will instruct the associated transfer unit 24 to disable or adjust the output supply until acceptable levels are achieved. The AMC 26 is also configured to evaluate a volatility function associated with each RPS 14. The volatility function describes patterns associated with the type of RPS 14. For example, if one of the RPS's 14 is a wind turbine, the volatility function will evaluate current weather patterns to ensure proper wind is available or if a low wind condition is predicted. If a period of volatility is detected, the AMC 26 may control the transfer units 24 to increase available reserve power via charging the ESU's 16 at or beyond reserve thresholds or up to or beyond maximum thresholds. Thresholds related to ESU's will be discussed in further detail below. The AMC 26 may control dormant gensets 18 to turn on to increase available spinning reserve or increase the spinning reserve threshold for currently active gensets 18. It should be appreciated that the AMC 26 is configured to evaluate volatility for all types of RPS's 14 as previously described.

The AMC 26 also monitors the maximum available power supplied by the RPS 14. If the RPS 16 alone cannot manage the load 22, the AMC 26 is configured to enable the ESU's 16 and/or genset 18 to supplement the load sharing. If the load is less than what the RPS 14 and can supply, the AMC 26 will then control the transfer unit 24 to redirect excess power from the common bus 20 to the ESU 16 to store the excess power as reserve power. However, if the power supplied by the RPS 14 is greater than the load 22 and reserve capacity of the ESU 16, the AMC 26 will curtail the excess power in order to avoid reverse powering any of the gensets 18 operatively connected to the common bus 20. Reverse powering gensets operating at a reserve power capacity can do signification damage to the gensets 18 resulting in potential repair and thus reducing the overall lifetime of the unit and cost to operate the damaged units. The AMC 26 evaluates the volatility function, the kW/kVA threshold, and the available power source to determine the cost function associated with each RPS 14.

Figure 2:
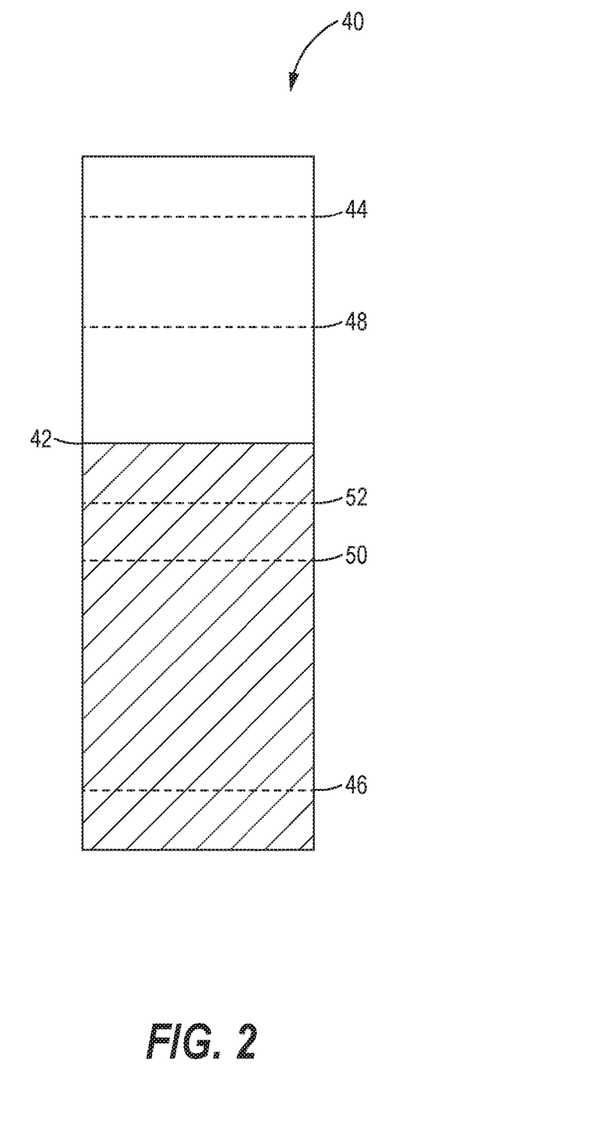
FIG. 2 is an illustration of a charge capacity of an energy storage unit in accordance with an embodiment of the present disclosure.

With reference to FIG. 2, a total charge capacity 40 of the ESU 16 with a current SoC 42 is illustrated. Each ESU 16 has a number of operational thresholds akin to rules that ensure a long useable lifetime and optimizing available reserve power for the micro-grid system 10. Each ESU 16 has a maximum charge limit 44, a maximum discharge limit 46, an optimal charge limit 48, an optimal discharge limit 50, a discharge long limit 52, and the number of discharge cycles associated therewith. The maximum charge limit 44 is the maximum recommended SoC for the ESU 16 after which risk of catastrophic failure increases which can put the equipment and/or operators in harm's way. Similarly, the maximum discharge limit 46 is the minimum recommended SoC for the ESU 16 after which risk of catastrophic failure increases which can put the equipment and operators in harm's way.`

The optimal charge 48 and optimal discharge limits 50 ensure that the SoC of the ESU 16 is within an optimal range. Operating each ESU 16 within its corresponding optimal range maximizes lifetime and avoids premature failure. The discharge long limit 52 is a conservative discharge limit that is determined historically based on the number of charge/discharge deep cycles or the number of deep cycles per day. The AMC 26 determines the average discharge limit before a charging cycle is commenced and adjusts the SoC in order to achieve the discharge long limit 52. It should be appreciated that the maximum limits 44, 46; the optimal limits 48, 50; and the long limit 52 define upper and lower operating thresholds for the ESU 16.

Each transfer unit 24 associated with a corresponding ESU 16 monitors the SoC and transmits that data to the AMC 26 such that the AMC 26 can determine the corresponding storage cost function for each ESU 16. The AMC 26 can transmit control signals to each transfer unit 24 to control the operation of the ESU 16 according to the predefined operational thresholds to optimize the storage cost function. For example, if an ESU 16 is approaching either of the maximum limits 44, 46, the AMC 26 will instruct the corresponding transfer unit 24 to either disable the ESU 16 or adjust the SoC such that it is within safe limits by either charging or discharging the ESU 16. The AMC 26 is configured to control the transfer unit 24 of each ESU 16 such that the SoC is optimized according to its storage cost function. For example, the AMC 26 will generally rely upon the RPS 14 versus the genset 18 due to the lower evaluated renewable cost function compared to a genset cost function. Unless RPS 14 power is unavailable due to environmental conditions which will affect the renewable cost function such that a genset 18 will be relied upon to charge the ESU 16.

Figure 3:
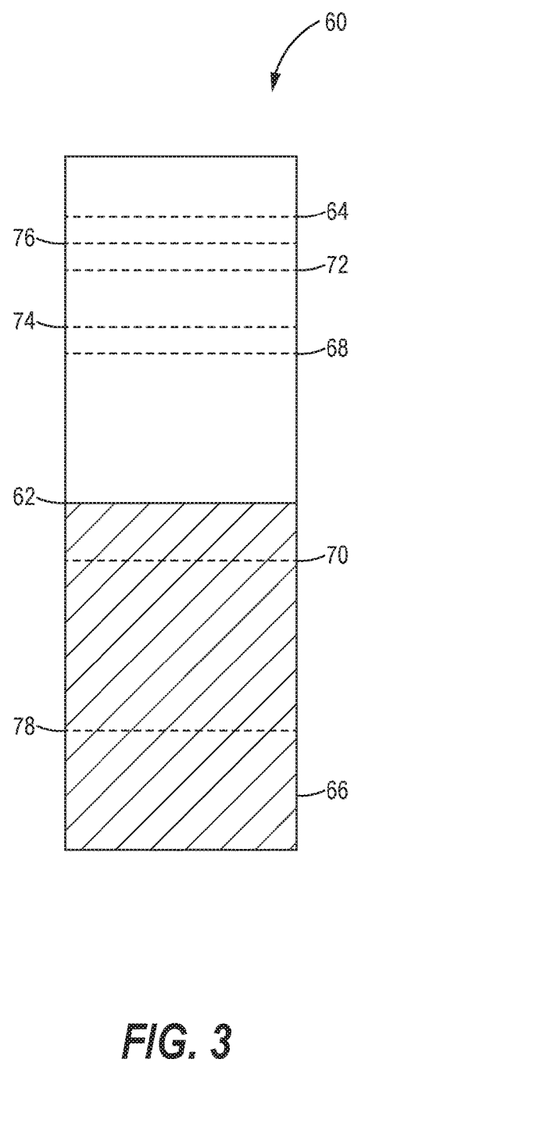
FIG. 3 is a is an illustration of a total operating capacity in accordance with an embodiment of the present disclosure.

With reference to FIG. 3, a total operating capacity 60 of the genset 18 with a current load 62 is illustrated. Similar to the RPS 14 and ESU 16, each genset 18 has a plurality of operational thresholds that ensures highest efficiency, lowest fuel consumption, optimal spinning reserve, and lowest emissions production while reducing the number of power cycles (i.e. start/stop cycles) and avoiding minimum loading conditions to avoid wet stacking. Each genset 18 has a rated maximum loading limit 64 and a minimum loading limit 66 defines the rating range outside of which may cause damage to the genset 18 and cause wet stacking, respectively. Each genset 18 also has an optimal operating range or optimal efficiency range defined by an optimal upper threshold 68 and an optimal lower threshold 70 where the genset 18 performance is operating at the highest efficiency rated for the particular genset 18. Each genset 18 also has a target threshold 72 which should only be exceeded for short periods to account for transient conditions beyond the capability of the RPS 14 and ESU 16. Exceeding the target threshold 72 too often has a detrimental effect on the overall lifetime of the genset 18 and should be avoided unless necessary. Each genset has a plurality of trigger thresholds that define whether to add or drop a threshold. For example, each genset 18 has an add threshold 74 just beyond the optimal upper threshold which signifies that the current genset 18 is operating just beyond the optimal and a subsequent generator should be brought online to service the load 22. A fast-add threshold 76 indicates that genset 18 is operating beyond the target threshold 72 and dangerously close to the maximum loading limit 66. In this instance, a subsequent genset 18 is brought on quickly circumventing standard startup procedures to quickly service the load 22 in case a transient may push the current loading 62 beyond the rated maximum loading threshold 64. Each genset 18 also has a drop threshold 78 which signifies that the corresponding genset 18 is to be turned off to avoid wet stacking at the minimum loading limit 56. It should be appreciated that the maximum loading limits 64, 66; the optimal thresholds 68, 70; the add threshold 74; fast-add threshold 76; and drop threshold 78 define the upper and lower operating thresholds for the genset 18.

It should be appreciated that the thresholds described for each type of power source 14, 16, 18 maybe at least stored in the memory module 30 as user selectable settings. A user can adjust the setting via an external computing device (not shown) communicatively coupled with the AMC 26. The thresholds can be stored as a look-up table that stores the relevant settings for each particular type of power source 14, 16, 18.

INDUSTRIAL APPLICABILITY

In general, the hybrid micro-grid system 10 of the present disclosure can find applicability in in various industrial applications such as but not limited to remote villages, islands, remote mining sites, remote military installations, on-board ships. The micro-grid system 10 may include at least a RPS 14, an ESU 16, and a genset 18. The power sources 12 are configured to meet the power demand requirements when a load 22 is applied to a common bus 20.

By generating a cost function and maintaining operation of the power sources 12 within optimal operating ranges, an AMC 26 can reduce the overall operating cost of the micro-grid system 10. During operation, the transfer units 24 transmit signals regarding the recorded operational data to the AMC 26 and the AMC determines and updates the cost function in real-time for each power source 14, 16, 18 during operation while servicing the load 22. The AMC 26 assigns a priority to each power source 14, 16, 18 based on the corresponding cost function. The AMC 26 then selectively distributes the power demand of the load 22 amongst the power sources 14, 16, 18 according to the determined priority. For example, the AMC 26 is configured to distribute the load 22 to the RPS 14 only if the power source of the RPS 14 is greater than the power demand of the load 22, the AMC 26 then sinks any excess power to the ESU 16. The AMC 26 is configured to activate the RPS 14 and ESU 16 only if their combined power output is greater than the power demand of the load 22. Finally, the AMC 26 is configured to distribute the load 22 to all of the power sources 14, 16, 18 if the combined power output is greater than the power demand of the load 22. The AMC 26 will distribute the load 22 accordingly based on the cost function for each power source 14, 16, 18 to ensure a lowest combined cost function is achieved. It should be appreciated that the cost function for each power source 12 is updated dynamically while activated or deactivated and thus affecting the priority assigned to the corresponding power source 14, 16, 18. An activated power source 14, 16, 18 maybe deactivated in favor of a deactivated power source 14, 16, 18 that currently has a lower cost function and thus a higher priority.

The AMC 26 determines a cascade or a cascading order of the power sources 14, 16, 18 based on the determined priority which in turn is based on the determined cost function. The AMC 26 then activates a subsequent power source 14, 18 in response to exceeding an upper threshold of the preceding power source 14, 16, 18. For example, if the micro-grid system was running solely on the RPS 14 and the load 22 exceeds the kW/kVA supply threshold, the AMC 26 would control the transfer unit 24 to activate the ESU 16 to supplement the RPS 14 to service the load 22. If the load 22 exceeds the optimal discharge limit 50 for the ESU 16, then the AMC 26 would control the corresponding transfer unit 24 to activate a genset 18 to ensure that ESU remains within its optimal SoC range 48, 50 while still operating the genset within its optimal loading range 68, 70. The AMC 26 is configured to control all of the connected power sources 14, 16, 18 such that not only do they service the load 22 but also stay within optimal operating parameters in order to reduce operating cost and prolong useable lifetime.

Similarly, the AMC 26 deactivates said subsequent power source in the cascade, i.e. the most recently activated power source, in response to exceeding a lower threshold of said subsequent power source 14, 16, 18. Continuing with the previous example, when the distributed load 22 exceeds below the drop threshold 78 of the genset 18, the AMC 26 controls the transfer unit 24 to disable or idle the genset 18 and relies only the RPS 14 and ESU 16. In another example, the if SoC of the ESU 16 falls below optimal discharge limit 15, the AMC 26 may control the transfer unit 24 of the genset 18 to direct power to the ESU 16 and not the load 22 because the associated cost function to use the genset 18 to charge the ESU 16 instead of the servicing the load 22 was lower than using the genset 18 to service the load 22 directly. In other words, the AMC 26 acts in real-time to constantly update the cost functions of each power source 14, 16, 18 to find the optimal strategy to lower the overall cost function of the micro-grid system 10. The AMC 26 determines the amount of excess energy available from the power sources 14, 16, 18 based on a difference between the aggregate supplied energy of the activated power sources 14, 16, 18 and the power demand of the load 22. The excess power can be redirected to the ESU 16 until the SoC is within the optimal range 48, 50 or the optimal charge limit 50 is reached.

The AMC 26 is configured to curtail and excess energy beyond the ESU 16 optimal charge limit 50 in order to avoid reverse powering any connected genset 18. In situations where the ESU 16 cannot sink excess power generated by the RPS 14, the excess power may reverse power the genset 18 which can cause damage to the equipment. To avoid reverse powering, the AMC 26 constantly monitors the supply from the RPS 14, the SoC 42 of the ESU 16, the operating load 62 of the genset, and the load 22. For example, if the excess power, i.e. supply from RPS less the load 22, is greater than the available overhead in the ESU 16, i.e optimal charge limit 48 minus the SoC 42, then excess power has now where to go and should be curtailed. The AMC 26 is configured to control the transfer unit 24 associated with the RPS 14 to quickly disconnect the supply power and control the transfer unit 24 associated with the genset 18 to quick isolate the genset 18 from the common bus 20 until a favorable condition is detected. The AMC 26 may distribute the load 22 on to the ESU 16 until the SoC 42 is low enough to sink the excess power from the RPS 14.

Figure 4:
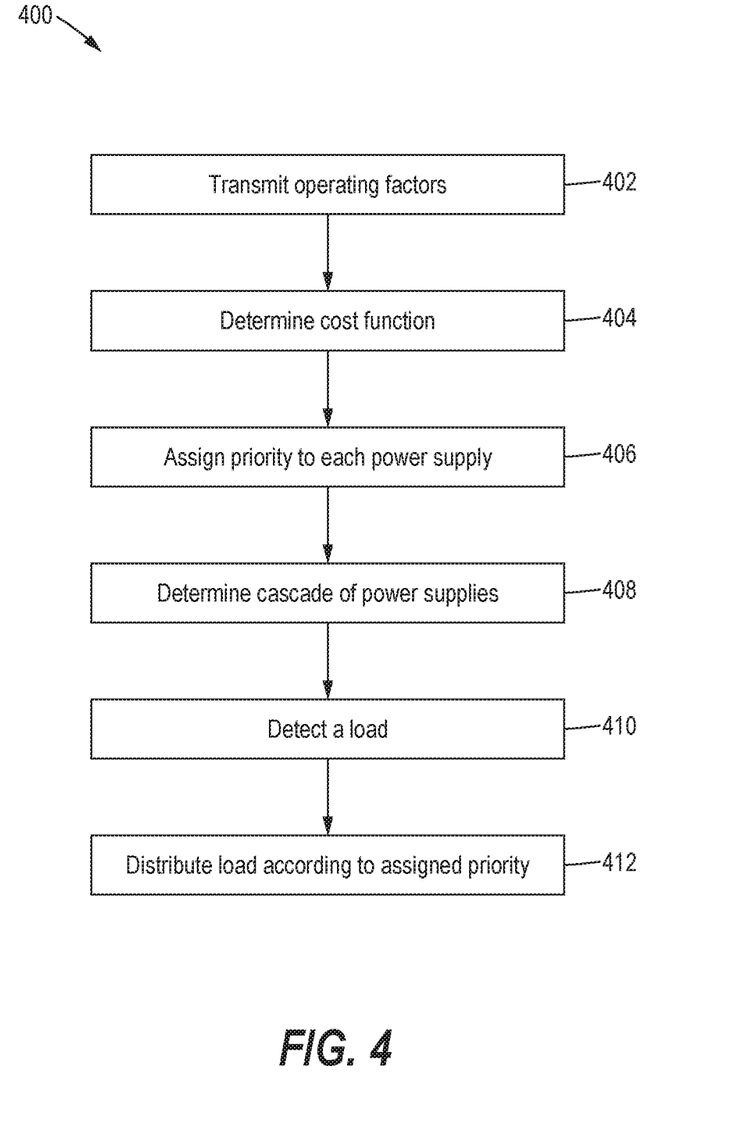
FIG. 4 is a flow chart of a method in accordance with an embodiment of the present disclosure.

Referring to FIG. 4, a flow chart 400 of a method of operating a hybrid micro-grid system 10 is presented. Once the power source 14, 16, 18, are connected to the common bus 20, the corresponding transfer units 24 transmits the operating factors which are then received by the AMC 26 for storage in the memory module 30, block 402. The AMC 26 determines a renewable cost function, a genset cost function, and a storage cost function based on the operational factors, block 404. The AMC 26 then assigns a priority to each power source 14, 16, 18 based on the determined cost function, block 406. Then, the AMC 26 determines a cascade of the power sources based on the assigned priority, block 408. Once the AMC 26 detects a load 22 on the common bus 20, block 410, the AMC 26 distributes the load 22 among the power sources 14, 16, 18 according to the assigned priority, block 412.

Figure 5:
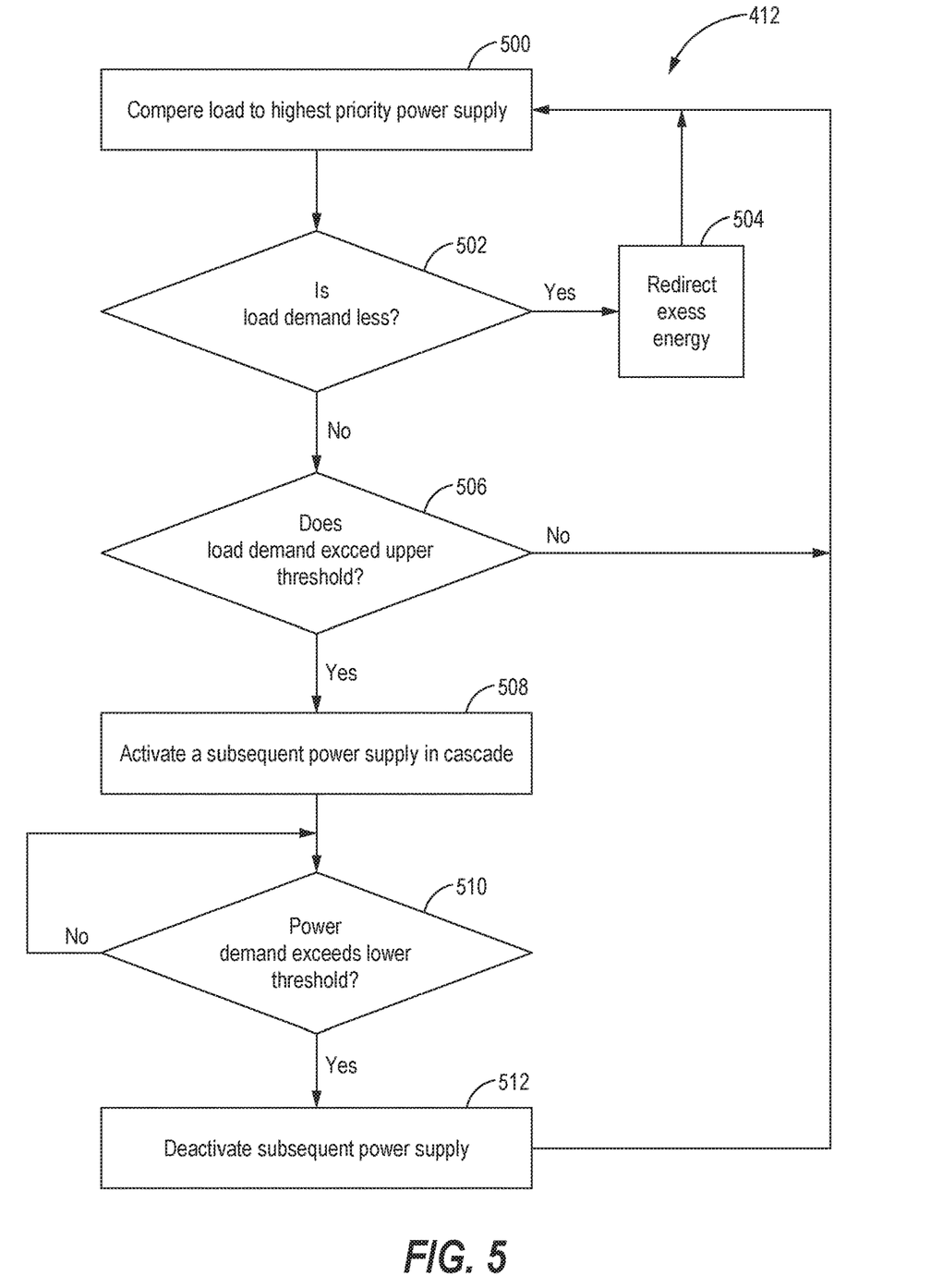
FIG. 5 is a flow chart of a method in accordance with an embodiment of the present disclosure.

With reference to FIG. 5, a flow chart of the method step of block 412 for distributing power to the power sources 14, 16, 18 according to the assigned priority is illustrated. The AMC 26 compares the load 22 to the available power of the highest priority power source 14, 16, 18, i.e. the current priority power source, in the cascade and distributes the load thereto, block 500. In block 502, The AMC 26 determines if the power demand of the load 22 is less than the available power of the highest priority power source 14, 16, 18. The AMC 26 redirects the excess energy is to the ESU 16 until an optimal charge limit threshold is reached, block 504. In block 506, if the power demand exceeds one of the upper thresholds of the current priority power source 14, 16, 18, then the AMC 26 activates a subsequent power source in the cascade to service the load 22 beyond the capabilities of the current power source 14, 16, 18, block 508. In block 510, if the power demand exceeds one of the lower thresholds of the current power source 14, 16, 18, the AMC 26 then deactivates or idles the current power source 14, 16, 18 because the preceding power source is capable of servicing the load 22, block 512.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein is merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

What is claimed is:

1. A hybrid micro-grid system, the system comprising:
   a plurality of power sources each configured to selectively supply power to a common bus, the plurality of power sources including at least one renewable power source (RPS), at least one genset, and at least one energy storage unit (ESU); and
   an asset management controller (AMC) operatively coupled to the plurality of power sources, wherein the AMC is configured to:
      determine a renewable cost function associated with the at least one RPS, a genset cost function associated with the at least one genset, and a storage cost function associated with the at least one ESU, wherein the storage cost function is based on at least a state of charge, state of health, number of discharge cycles, and an optimal charge range of the at least one ESU,
      assign a priority to each power source based on the corresponding cost function,
      selectively distribute a power demand of a load connected to the common bus between each power source based on the determined priority.

2. The system of claim 1, wherein the renewable cost function based on at least a supply and a volatility function of the supply of the at least one RPS.

3. The system of claim 1, wherein the genset cost function is based on at least an optimal operating range, fuel cost, fuel efficiency, emissions output, lifetime usage, number of power cycles, and spinning reserve of the at least one genset.

4. The system of claim 1, wherein the AMC is configured to:
   determine a cascade of power supplies based on the assigned priority;
   receive an upper and lower operating threshold for each power source;
   activate a subsequent power source in the cascade based on exceeding the upper threshold of a preceding power source; and
   deactivate said subsequent power source in the cascade based on exceeding the subsequent power source lower threshold.

5. The system of claim 4, wherein the upper and lower operating threshold of the at least one genset includes an optimal efficiency range, an add threshold, a fast add threshold, a drop threshold, a target threshold, spinning reserve threshold, a maximum rated threshold, and a minimum rated threshold.

6. The system of claim 4, wherein the upper and lower operating threshold of the at least one ESU includes an optimal charge limit, an optimal discharge limit, maximum charge limit, a maximum discharge limit, and a discharge long limit.

7. The system of claim 6, wherein the discharge long limit is based on a number of deep cycles per day.

8. The system of claim 4, wherein the AMC is further configured to:
determine an excess power based on a difference between an aggregate of reserve power of the activated power sources and the power demand of the load; and
redirect the determined excess power to the at least one ESU until an optimal charge limit threshold is reached.

9. The system of claim 8, wherein excess energy beyond the optimal charge limit is curtailed to avoid reverse powering the at least one genset.

10. The system of claim 1, wherein in the at least one RPS includes at least one of wind, photovoltaic, geothermal, tidal, and biofuel; the at least one genset includes at least one of a diesel generator, gas generator, and a dynamic gas blending generator; and the at least one ESU includes at least one of an ultra capacitor, a lithium-ion battery, and a high-power lead acid battery.

11. The system of claim 1, wherein the AMC is further configured to:
distribute the load to the at least one RPS only if a power source of the at least one RPS is greater than the power demand of the load and sink any excess power to the ESU;
distribute the load to the at least one RPS and the at least one ESU if a combined power output of the at least one RPS and the at least one ESU is greater than the power demand of the load; and
distribute the load to the at least one RPS, the at least one ESU, and the at least one genset if a combined power output of the plurality of power sources is greater than the power demand of the load.

12. A hybrid micro-grid system, the system comprising:
a plurality of power sources each configured to selectively supply power to a common bus, the plurality of power sources including at least one RPS, at least one genset, and at least one ESU; and
an AMC operatively coupled to the plurality of power sources, wherein the AMC is configured to:
determine a renewable cost function associated with the at least one RPS, a genset cost function associated with the at least one genset, and a storage cost function associated with the at least one ESU, wherein the storage cost function is based on at least a state of charge, state of health, number of discharge cycles, and an optimal charge range of the at least one ESU,
assign a priority to each power source based on the corresponding cost function,
determine a cascade of the power sources based on the assigned priority,
control a subsequent power source in the cascade based on exceeding an upper threshold of a preceding power source or a lower threshold of said subsequent power source.

13. The system of claim 12, wherein the AMC is further configured to:
determine an excess energy based on a difference between an aggregate supplied energy of activated power sources and the power demand of the load; and
redirect the determined excess energy to the at least one ESU until an optimal charge limit threshold is reached.

14. A method for operating a hybrid micro-grid system, the system including a plurality of power sources each configured to selectively supply power to a common bus, the plurality of power sources including at least one RPS, at least one genset, and at least one ESU, and an AMC operatively coupled to the plurality of power sources, the method comprising:
determining a renewable cost function associated with the at least one RPS, a genset cost function associated with the at least one genset, and a storage cost function associated with the at least one ESU, wherein the genset cost function is based on at least an optimal operating range, fuel cost, fuel efficiency, emissions output, lifetime usage, number of power cycles, and spinning reserve of the at least one genset; and the storage cost function is based on at least a state of charge, state of health, number of discharge cycles, and an optimal charge range of the at least one ESU;
assigning a priority of each power source based on the corresponding cost function; and
selectively distributing a power demand of a load connected to the common bus between each power source based on the assigned priority.

15. The method of claim 14, further including:
determining a cascade of power sources based on the determined priority;
receiving an upper and lower operating threshold for each power source;
activating a subsequent power source in the cascade based on exceeding the upper threshold of a preceding power source; and
deactivating said subsequent power source in the cascade based on exceeding the subsequent power source lower threshold.

16. The method of claim 15, wherein the upper and lower operating threshold of the at least one genset includes an optimal efficiency range, an add threshold, a fast add threshold, a drop threshold, a target threshold, spinning reserve threshold, a maximum rated threshold, and a minimum rated threshold; and the upper and lower operating threshold of the at least one ESU includes an optimal charge limit, an optimal discharge limit, maximum charge limit, a maximum discharge limit, and a discharge long limit.

17. The method of claim 15, further including:
determining an excess energy based on a difference between an aggregate supplied energy of the activated power sources and the power demand of the load; and
redirecting the determined excess energy to the at least one ESU until an optimal charge limit threshold is reached.

18. The method of claim 17, wherein excess energy beyond the optimal charge limit is curtailed to avoid reverse powering the at least one genset.

* * * * *